Patented Sept. 26, 1950

2,523,744

UNITED STATES PATENT OFFICE 2,523,744

SYNTHESIS OF ASPARTIC ACID

Donald T. Warner and Owen A. Moe, Minneapolis, Minn., assignors to General Mills, Inc., a corporation of Delaware No Drawing. Application December 6, 1946, Serial No. 714,647

4 Claims. (Cl. 260—482)

The present invention relates to the synthesis of aspartic acid from novel aldehydo compounds.

These aldehydo compounds may be represented by the following structural formula:

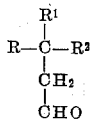

in which R may be hydrogen, carboxyl, carboxylic acid ester, carbonamide (—$CONH_2$, —$CONHR$, etc.), or nitrile; $R^1$ may be carboxyl, carboxylic acid ester, carbonamide, or nitrile; $R^2$ is a substituted amino group in which at least one of the hydrogens has been replaced with a group which is capable of being removed by hydrolysis, reduction, or the like.

The esterifying group of the carboxylic acid ester in the above formula may vary widely and may include alkyl, aryl, aralkyl, alkyaryl, and other groups such as methyl, ethyl, propyl, phenyl, benzyl, toluyl, etc. Of these, the low alkyl groups are preferred. Similar variations are possible in the carbonamide groups. $R^2$ may include such groups as phthalimido; N acyl, such as $NOCCH_3$, $NOCC_6H_5$, etc.; N sulfonyl, for example, $NSO_2C_6H_5$; N carbobenzoxy, for example, $NCOOCH_2C_6H_5$; and the like. It will be apparent that $R^2$ may be mono-substituted or may be di-substituted by any group or combination of groups of the above type.

The preparation of aspartic acid from compounds of this type involves the oxidation of the aldehyde group to the acid and then the hydrolysis of the various groups (ester, nitrile, carbonamide, substituted amino, etc.) to the corresponding free acid and amino groups.

The aldehydes employed in the present process may be prepared in accordance with the disclosure of our copending application, Serial No. 714,-643, filed of even date herewith, entitled Beta-Acetamido-Beta,Beta-Dicarbalkoxy Propionaldehydes and Process. According to the application, these aldehydes may be prepared, for example, by the reaction of acetamido malonic ester or acetamido cyano acetic ester with an allylhalide to produce the corresponding allyl derivative. The double bond in this allyl derivative may be ozonized to the ozonide, which may then be converted to the above described aldehyde.

The oxidation of the aldehyde to the acid is comparatively simple to carry out since the aldehydo compound displays excellent water solubility. The oxidation may be carried out by means of any suitable mild oxidation agent, such as potassium permanganate, hydrogen peroxide, sodium chlorite, bromine water, chromic acid, and the like. The resulting substituted propionic acid may be isolated either as the crystalline intermediate or may be hydrolyzed directly to aspartic acid. In the hydrolysis, there are two possible routes, one involving alkaline hydrolysis, and the other involving acid hydrolysis. The acid hydrolysis yields the aspartic acid directly, since it effects hydrolysis and decarboxylation simultaneously. If the alkaline hydrolysis is employed, the decarboxylation may be performed in a separate step.

The aspartic acid may be obtained in a suitable manner. For example, it may be isolated as a copper salt. This may be obtained by the addition of copper acetate to a slightly acidic hydrolysis mixture. The copper salt may then be crystallized and isolated, after which it may be acidified, for example by means of hydrogen sulfide which liberates the aspartic acid and at the same time precipitates the copper. The aspartic acid may then be crystallized from the filtered solution.

The following example will serve to illustrate the inventon:

EXAMPLE

A. *Oxidation of beta-acetamido-beta,beta-dicarbethoxy propionaldehyde to beta-acetamido-beta,beta-dicarbethoxy acid*

3.3 parts of the aldehydo compound were dissolved in 20 parts of water with slight warming. The resulting solution was cooled and a few drops of 10% sodium hydroxide were added. A saturated aqueous solution of potassium permanganate was added dropwise. The oxidation was very rapid and the solution became warm. The resulting reaction mixture was cooled in a cold water bath as the addition of the potassium permanganate solution was continued. When the reaction was complete, the precipitated manganese dioxide was removed by filtration. The clear filtrate was acidified with dilute hydrochloric acid and the pH at this point was approximately 3. The very slight excess of potassium permanganate was removed by the addition of a dilute sodium bisulfite solution. The resulting water-clear solution was evaporated in vacuo to a total volume of approximately 5 ml. An inorganic precipitate was noted at this point and it was removed by filtration. The clear filtrate was extracted with chloroform. The chloroform extract was dried over calcium chloride and concentrated to dryness in vacuo. A residual oil was obtained which slowly crystallized on standing. The crystalline product was extracted with warm benzene and filtered. The benzene filtrate yielded a crystalline product when diluted with petroleum ether. This white crystalline material melted at 137–141° C. Further purification by crystallization from benzene yielded a white crystalline compound melting sharply at 147–148° C. This crystalline material was beta-acetamido-beta,beta-dicarbethoxy propionic acid.

The aqueous solution remaining after the chloroform extractions still contained considerable quantities of crude beta-acetamido-beta,beta-dicarbethoxy propionic acid. It was evaporated to dryness and a residual oil resulted which partially solidified on standing. This residual oil was used in the subsequent hydrolysis which will be described in part B.

B. *Hydrolysis of beta-acetamido-beta, beta-dicarbethoxy propionic acid*

The above described residual oil which partially solidified on standing was mixed with 7 parts of concentrated hydrochloric acid. The resulting reaction mixture was refluxed for a period of four hours. At this point the solution possessed a light brown color. After the reflux period was complete, the reaction mixture was diluted with a small amount of water and evaporated to dryness in vacuo. The residue appeared as a pasty solid. 2.5 parts of water was added to the residue and the resulting solution was cooled overnight. A small amount of the crystalline product had deposited and this was removed by filtration and proved to be inorganic. The light brown filtrate was just neutralized with dilute sodium hydroxide, then dilute hydrochloric acid was added until the solution was acidic to methyl red.

C. *Isolation of copper aspartate and aspartic acid*

The above described solution which had been made just acidic to methyl red was treated with a hot aqueous solution of copper acetate monohydrate. After standing for approximately 90 minutes, the copper salt started to crystallize as a light blue crystalline product. This reaction mixture was permitted to stand in the refrigerator overnight. The copious quantity of the copper salt was collected by filtration and the copper aspartate was air-dried. After drying, the copper salt was suspended in dilute (approximately one normal) acetic acid. A stream of hydrogen sulfide was introduced into the reaction mixture and the copper precipitated as copper sulfide. The precipitated copper sulfide was removed by filtration and the resulting clear filtrate was evaporated slowly in vacuo. The dl-aspartic acid soon crystallized as a white crystalline product. When the total volume of the filtrate was approximately 3 ml., it was warmed on the steam bath until complete solution was obtained. 10 parts of absolute ethyl alcohol were added to the clear solution, and immediately the precipitation of a white crystalline product was noted. The crystalline dl-aspartic acid was collected by filtration and washed with dilute alcohol. After drying the dl-aspartic acid melted at 300° C. with decomposition.

While various modifications of the above invention have been described, it is to be understood that the same is not limited thereto, but may be varied within the scope of the following claims.

We claim as our invention:

1. Beta-acetamido-beta, beta-dicarbethoxy propionic acid.

2. A compound having the following formula:

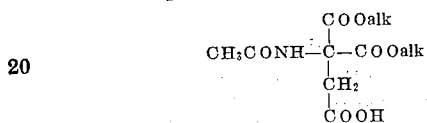

in which alk is a lower alkyl group.

3. Process of preparing aspartic acid from a compound having the following formula:

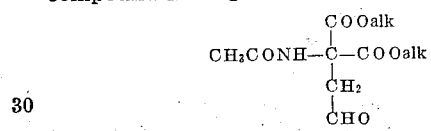

in which alk is a lower alkyl group; which comprises oxidizing the aldehyde at a low temperature with an alkaline permanganate to convert the aldehyde group to the acid, then subjecting the acid to hydrolysis in the presence of concentrated hydrochloric acid at reflux temperatures to hydrolyze and decarboxylate said compound to aspartic acid.

4. Process of preparing aspartic acid from beta-acetamido-beta, beta-dicarbethoxy propionaldehyde which comprises oxidizing the aldehyde at a low temperature with an alkaline permanganate to convert the aldehyde group to the acid, then subjecting the acid to hydrolysis in the presence of concentrated hydrochloric acid at reflux temperatures to hydrolyze and decarboxylate said compound to aspartic acid.

DONALD T. WARNER.
OWEN A. MOE.

REFERENCES CITED

The following references are of record in the file of this patent:

UNITED STATES PATENTS

| Number | Name | Date |
|---|---|---|
| 2,316,543 | Amend | Apr. 13, 1943 |

OTHER REFERENCES

Dakin: "Jour. Biol. Chem.," vol. 154 (1944), pp. 552–555.